US010579733B2

(12) United States Patent
Riesa et al.

(10) Patent No.: US 10,579,733 B2
(45) Date of Patent: Mar. 3, 2020

(54) IDENTIFYING CODEMIXED TEXT

(71) Applicant: Google LLC, Mountain View, CA (US)

(72) Inventors: Jason Riesa, San Francisco, CA (US);
Daniel Gillick, Oakland, CA (US);
Yuan Zhang, Santa Clara, CA (US);
Anton Bakalov, Jersey City, NJ (US);
Jason Baldridge, Mountain View, CA (US); David Weiss, Mountain View, CA (US)

(73) Assignee: Google LLC, Mountain View, CA (US)

( * ) Notice: Subject to any disclaimer, the term of this patent is extended or adjusted under 35 U.S.C. 154(b) by 99 days.

(21) Appl. No.: 15/976,647

(22) Filed: May 10, 2018

(65) Prior Publication Data
US 2019/0347323 A1 Nov. 14, 2019

(51) Int. Cl.
G06F 17/27 (2006.01)
G06N 7/00 (2006.01)

(52) U.S. Cl.
CPC .......... *G06F 17/277* (2013.01); *G06F 17/275* (2013.01); *G06F 17/2785* (2013.01); *G06N 7/005* (2013.01)

(58) Field of Classification Search
USPC ...................................... 704/1–10
See application file for complete search history.

(56) References Cited

U.S. PATENT DOCUMENTS

| 6,047,251 A | 4/2000 | Pon et al. |
| 7,917,361 B2 | 3/2011 | Li et al. |
| 9,483,768 B2 | 11/2016 | Singh |
| 9,779,085 B2 | 10/2017 | Wick et al. |
| 2011/0246180 A1* | 10/2011 | Lai ......................... G06F 17/275 704/9 |
| 2012/0330989 A1* | 12/2012 | Tan ........................ G06F 17/275 707/760 |
| 2014/0052436 A1* | 2/2014 | Qian ..................... G06F 17/2223 704/9 |
| 2015/0006148 A1* | 1/2015 | Goldszmit ............ G06F 17/275 704/8 |
| 2015/0161227 A1* | 6/2015 | Buryak ................... G06F 9/454 707/738 |

OTHER PUBLICATIONS

Multilingual Language Indentification on Character Window, Tom Kocmi, Apr. 3-7, 2017.
An Off-the-shelf Language Identification Tool, Marco Lui, Baldwin, Jul. 2012.
Incorporating Dialectal Variability for Socially Equitable Language Indentification, Jurgens et. al, Jul. 2017.

* cited by examiner

*Primary Examiner* — Jesse S Pullias
(74) *Attorney, Agent, or Firm* — Honigman LLP; Brett A. Krueger

(57) ABSTRACT

A method for identifying codemixed text includes receiving codemixed text and segmenting the codemixed text into a plurality of tokens. Each token includes at least one character and is delineated from any adjacent tokens by a space. For each token of the codemixed text, the method also includes extracting features from the token and predicting a probability distribution over possible languages for the token using a language identifier model configured to receive the extracted features from the token as feature inputs. The method also includes assigning a language to each token of the codemixed text by executing a greedy search on the probability distribution over the possible languages predicted for each respective token.

26 Claims, 13 Drawing Sheets 200,
200a

Dame ese book that you told me about
 202,    202,    202,    202,   202,   202,   202,   202,
202aa  202ab  202ac  202ad 202ae 202af 202ag 202ah

| Dataset | Twitter-Mix | Web-Mix6 | GY-Mix | | | Average |
|---|---|---|---|---|---|---|
| Languages | es/en | 6 Langs | es/en | hi/en | id/en | |
| LanideNN | 71.3 | 52.1 | 65.7 | 79.6 | 22.9 | 58.3 |
| EquiLID | 87.9 | 63.5 | 71.0 | 81.9 | 64.9 | 73.9 |
| CMX-small | 92.9 | 91.9 | 90.6 | 98.0 | 88.1 | 92.3 |
| CMX | 95.1 | 90.5 | 92.9 | 98.0 | 90.9 | 93.5 |

FIG. 7B

| MODEL | Sent Acc. | Char/Sec |
|---|---|---|
| CODEMIXING MODELS | | |
| LanideNN | 94.3 | 0.17k |
| EquiLID | 95.0 | 0.25k |
| CMX-small | 95.2 | 265.5k |
| CMX | 98.2 | 206.1k |
| MONOLINGUAL MODELS | | |
| Langid.py | 92.7 | 183.8k |
| fastText-small | 92.4 | 2,671.1k |
| fastText-full | 94.4 | 2,428.3k |
| CLD2 | 95.5 | 4,355.0k |

FIG. 7C

IDENTIFYING CODEMIXED TEXT

TECHNICAL FIELD

This disclosure relates to identifying codemixed text.

BACKGROUND

Documents, social media posts, and online message boards containing codemixed text in multiple languages are becoming increasingly prevalent. User-generated content, such as web articles, tweets, and message boards commonly include codemixed text in which the user switches between multiple languages. In many communities that include speakers of at least two languages, such as Hindi and English, codemixing text is the norm, especially in informal contexts. While sentence level- and document level language identifiers are available in metadata, their models typically use character- and word-level statistics as inputs. Thus, languages output from these sentence level- and document level language identifiers are susceptible to ambiguity when the input text is short since there is less context for making a language prediction. As a result, sentence level- and document level language identifiers are unable to provide per-token (e.g., per-word) language identification on codemixed text, which is needed for many multilingual downstream tasks, including syntactic analysis, machine translation, and dialog systems. It is infeasible for humans to obtain token-level labels for hundreds of languages since candidate codemixed examples must be identified and then annotated by multilingual speakers. Moreover, since codemixing is most common in informal contexts, token-level labels would also need to be obtained to account for a seemingly endless amount of non-standard words (e.g. slang), misspellings, transliteration, and abbreviations.

SUMMARY

One aspect of the disclosure provides a method for identifying codemixed text that includes receiving, at data processing hardware, codemixed text and segmenting, by the data processing hardware, the codemixed text into a plurality of tokens. Each token includes at least one character and is delineated from any adjacent tokens by a space. For each token of the codemixed text, the method also includes extracting, by the data processing hardware, features from the token and predicting, by the data processing hardware, a probability distribution over possible languages for the token using a language identifier model configured to receive the extracted features from the token as feature inputs. The method also includes assigning, by the data processing hardware, a language to each token of the codemixed text by executing a greedy search on the probability distribution over the possible languages predicted for each respective token.

Implementations of the disclosure may include one or more of the following optional features. In some implementations, the method also includes, for each token of the codemixed text, extracting, by the data processing hardware, features from any adjacent tokens. In these implementations, the language identifier model is further configured to receive the extracted features from the adjacent tokens as feature inputs for predicting the probability distribution over possible languages for the corresponding token. The feature inputs may include at least one of character features, script features, or lexicon features.

In some examples, extracting features from the token includes identifying all character n-gram features in the corresponding token, and for each character n-gram feature, calculating a corresponding frequency of the character n-gram feature in the corresponding token by dividing a corresponding number of occurrences for the character n-gram in the corresponding token by a total number of character n-grams identified from the corresponding token. Identifying all character n-gram features may optionally include identifying at least one of character unigram features, character bigram features, character trigram features, or character quadrigram features in the corresponding token.

Additionally, extracting features from the token may optionally include identifying all character script features in the corresponding token, determining a unicode value for each identified character script feature, and assigning each identified character script feature a corresponding character script type from a set of possible character script types based on the corresponding unicode value for the identified character script feature. The assigned character script type may be associated with only one language.

In some implementations, extracting features from the token includes: querying a lexicon library stored in memory hardware in communication with the data processing hardware, the lexicon library comprising a pool of word entries and corresponding language probability distributions for each word entry in the pool of word entries; determining whether the token matches one of the word entries of the lexicon library; and when the token matches one of the word entries of the lexicon library, retrieving the corresponding language probability distribution for the word entry that matches the token.

The language identifier model may optionally include a feed-forward neural network that includes an embedding layer, a hidden layer interconnected to the embedding layer in a feed-forward manner, and an output layer interconnected to the hidden layer in the feed-forward manner. The embedding layer is configured to: receive the feature inputs, each feature input including a sparse matrix; map the sparse matrix of each respective feature input to dense embedding vectors, resulting in a learned embedding matrix; and concatenate each learned embedding matrix corresponding to each received feature input. The hidden layer is configured to receive the embedding layer and apply a rectified linear unit (ReLU) of the embedding layer. The output layer is configured to output a probability for each possible language for each respective token. In some examples, the output layer includes a softmax layer.

In some implementations, the method also includes receiving, by the data processing hardware, an assignment constraint that assumes at least one language assigned to at least one token of the codemixed text. In these implementations, assigning the language to each token of the codemixed text includes selecting the language having a greatest probability distribution for the respective token relative to any adjacent tokens based on the assignment constraint. The at least one assumed language of the assignment constraint may optionally include English or French. Additionally or alternatively, the assignment constraint may include at least one fixed set of language pairs permissible for assignment to each token of the codemixed text. The language identifier model may execute a lexicon feature dropout strategy during training that drops a sub-set of extracted lexicon features as feature inputs.

Another aspect of the disclosure provides a system for identifying codemixed text. The system includes data processing hardware and memory hardware in communication with the data processing hardware. The memory hardware stores instructions that when executed by the data processing hardware cause the data processing hardware to perform operations that include receiving codemixed text and segmenting the codemixed text into a plurality of tokens. Each token includes at least one character and is delineated from any adjacent tokens by a space. For each token of the codemixed text, the operations also include extracting features from the token and predicting a probability distribution over possible languages for the token using a language identifier model configured to receive the extracted features from the token as feature inputs. The operations also include assigning a language to each token of the codemixed text by executing a greedy search on the probability distribution over the possible languages predicted for each respective token.

This aspect may include one or more of the following optional features. In some implementations, the operations also include, for each token of the codemixed text, extracting features from any adjacent tokens. In these implementations, the language identifier model is further configured to receive the extracted features from the adjacent tokens as feature inputs for predicting the probability distribution over possible languages for the corresponding token. The feature inputs may include at least one of character features, script features, or lexicon features.

In some examples, extracting features from the token includes identifying all character n-gram features in the corresponding token, and for each character n-gram feature, calculating a corresponding frequency of the character n-gram feature in the corresponding token by dividing a corresponding number of occurrences for the character n-gram in the corresponding token by a total number of character n-grams identified from the corresponding token. Identifying all character n-gram features may optionally include identifying at least one of character unigram features, character bigram features, character trigram features, or character quadrigram features in the corresponding token.

Additionally, extracting features from the token may include identifying all character script features in the corresponding token, determining a unicode value for each identified character script feature, and assigning each identified character script feature a corresponding character script type from a set of possible character script types based on the corresponding unicode value for the identified character script feature. The assigned character script type may be associated with only one language.

In some implementations, extracting features from the token includes: querying a lexicon library stored in memory hardware in communication with the data processing hardware, the lexicon library comprising a pool of word entries and corresponding language probability distributions for each word entry in the pool of word entries; determining whether the token matches one of the word entries of the lexicon library; and when the token matches one of the word entries of the lexicon library, retrieving the corresponding language probability distribution for the word entry that matches the token.

The language identifier model may optionally include a feed-forward neural network that includes an embedding layer, a hidden layer interconnected to the embedding layer in a feed-forward manner, and an output layer interconnected to the hidden layer in the feed-forward manner. The embedding layer is configured to: receive the feature inputs, each feature input including a sparse matrix; map the sparse matrix of each respective feature input to dense embedding vectors, resulting in a learned embedding matrix; and concatenate each learned embedding matrix corresponding to each received feature input. The hidden layer is configured to receive the embedding layer and apply a rectified linear unit (ReLU) of the embedding layer. The output layer is configured to output a probability for each possible language for each respective token. In some examples, the output layer includes a softmax layer.

In some implementations, the operations also includes receiving an assignment constraint that assumes at least one language assigned to at least one token of the codemixed text. In these implementations, assigning the language to each token of the codemixed text includes selecting the language having a greatest probability distribution for the respective token relative to any adjacent tokens based on the assignment constraint. The at least one assumed language of the assignment constraint may optionally include English or French. Additionally or alternatively, the assignment constraint may include at least one fixed set of language pairs permissible for assignment to each token of the codemixed text. The language identifier model may execute a lexicon feature dropout strategy during training that drops a sub-set of extracted lexicon features as feature inputs.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A and 2B schematically illustrates examples of inter-mix and intra-mix text inputs.

FIG. 7B is a table illustrating language prediction accuracy of a neural network model on various training datasets of codemixed text.

FIG. 7C is a table illustrating language prediction accuracy of a neural network model on a corpus of monolingual text.

Like reference symbols in the various drawings indicate like elements.

DETAILED DESCRIPTION

Figure 1:
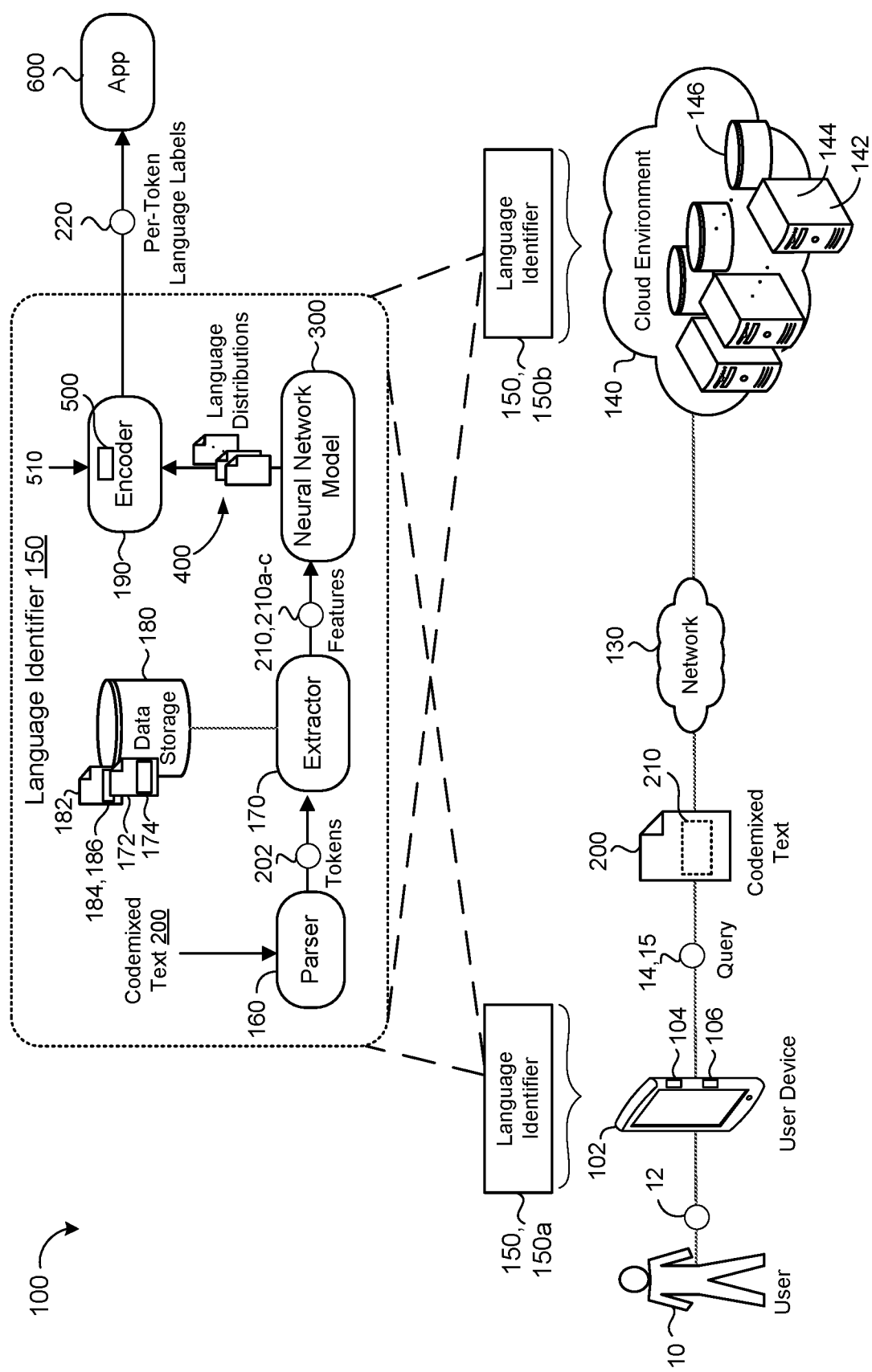
FIG. 1 schematically illustrates an example system for identifying codemixed text.

People are increasingly communicating through codemixed text containing multiple different languages. For informal contexts, such as social media posts, product reviews, and message boards, speakers of two or more languages routinely use codemixed text. This is especially the case when inputting text into mobile computing devices, such as smart phones and tablets, since it is not feasible or convenient for a multilingual user to switch between keyboards for different languages. While most services are trained to receive queries/entries in different languages, these services assume that an input of text entirely belongs to a single language. For instance, services affiliated with a given country (or affiliated with users from that country) may assume the dominant language of that country. Accordingly, these services are left to assume only one language when interpreting an input of codemixed text containing multiple languages, such as English/Spanish or French/Arabic. As a result, multilingual downstream services, including syntactic analysis, machine translation, and dialog systems, are unable to accurately process an entire input containing codemixed text since only one language is assumed to cover the whole input.

Implementations herein are directed toward a two-stage process for assigning per-token language labels in codemixed text by determining a probability distribution over possible languages for each token (i.e., a linguistic, such as a word) in the codemixed text during the first stage, and then assigning a language label to each token based on the probability distribution over possible languages and global constraints (e.g., assignment constraints) applied to the codemixed text during the second stage. For instance, during the first stage, the data processing hardware may receive codemixed text input by a user and parse the codemixed text into tokens, extract features of each token, and then predict the probability distribution over possible languages for each respective token using a feed-forward neural network configured to receive the extracted features as feature inputs. Here, the feature inputs may include at least one of character features (e.g., n-grams), script features (e.g., text scripts correlated with specific languages), or lexicon features, and the feed-forward neural network (e.g., efficient feed-forward classifiers) outputs a language distribution for every token independently from one another. A local context window may specify that extracting character features and/or lexicon features from a respective token also includes extracting character features and/or lexicon features from previous and following tokens (i.e., adjacent tokens) to provide additional context for the respective token.

Thereafter, the second stage may employ a decoder that receives the probability distribution over possible languages for each token output from the feed-forward neural network and assigns the language label to each respective token. Specifically, the decoder executes a decoding algorithm (e.g., greedy decoding strategy) configured to select the language having the greatest probability in the probability distribution for each respective token relative to language predictions for adjacent tokens based on global constraints applied over the entire input of codemixed text. The decoder may ensure high-quality language predictions on both monolingual texts as well as codemixed text inputs. Moreover, the global constraints improve accuracy in predicting the language labels for each token by permitting the decoding algorithm to assume at least one language assigned to at least one token of the codemixed text input. In some examples, a global or assignment constraint includes two or more fixed sets of language pairs permissible for assignment to each token in the input of text which may be monolingual or codemixed. For instance, for each fixed set of language pairs, the greedy decoding strategy may select the language from the corresponding language pair having the greatest probability in the probability distribution for each respective token and calculate a score for the corresponding fixed set of language pairs by summing the probabilities associated with the selected languages. Thereafter, the greedy decoding strategy assigns the language to each token using the selected languages from the fixed set of language pairs associated with the highest score.

Accordingly, implementations herein are directed toward using the two-stage process to assign a language to every token in codemixed text (e.g., a sentence, phrase, or utterance). The first stage predicts the probability distribution over possible languages for each token independently with a feed-forward neural network using character and token features from a local context window. The second stage determines a best assignment of token labels for the entire sentence of codemixed text using the greedy search (e.g., decoding algorithm) subject to global constraints. Since simply assigning the language associated with the highest probability to each token is susceptible to over-predicting too many languages in a single sentence of input text, subjecting the greedy search to global constraints provides an algorithmic paradigm that follows the problem solving heuristic of making the locally optimal choice at each stage with the hope of finding a global optimum. Thus, when compared to sequence-based models, such as conditional random fields (CRFs) or recurrent neural networks (RNNs), the two-stage process provides major advantages for fine-grained language identification. Namely, the two-stage process does not require annotations for codemixed text samples over hundreds of languages and their mixed parings. Additionally, the learning independent classifiers of the feed-forward neural network model followed by greedy decoding is significantly faster and substantially easier to implement that structured training.

Referring to FIG. 1, in some implementations, a system 100 includes a user device 102 associated with a user 10, who may communicate, via a network 130, with a remote system 140. The user device 102 includes data processing hardware 104 and memory hardware 106. In some implementations, the data processing hardware 104 executes a language identifier 150, 150a configured to receive codemixed text 200 including an utterance or sentence containing multiple languages, parse/segment the codemixed text 200 into a plurality of tokens 202, and assign a corresponding language label 220 to each token 202. As used herein, a token 202 may refer to a linguistic unit such as a word or one or more successive characters/symbols. Accordingly, each token 202 may be delineated from adjacent tokens 202 by a space in the codemixed text 200.

After assigning the language labels 220 to each token 202 of the codemixed text 200, the user device 102 may transmit the codemixed text 200 and corresponding language labels 220 over the network 130 for use by one or more applications/services 600 executing on the remote system 140. For instance, the codemixed text 200 may be an entry/query by the user 10 to a message board, a social media application, a product review platform, a search engine, navigation/map application, or other service executing on the remote system 140. Additionally or alternatively, an application 600 executing on the user device 102 may receive the codemixed text 200 and corresponding language labels 220 output from the language identifier 150a (or output from a language identifier 150b residing on the remote system 140). For example, the user device 102 may execute a translator for translating the codemixed text 200 into a desired language or a dialog application (e.g., a navigation application with turn-by-turn audible instructions or a virtual assistant) that converts text-to-speech may use the appropriate language label 220 assigned to each word (e.g., token) so that each word is pronounced correctly.

The user device 102 can be any computing device capable of communicating with the remote system 140 through the network 130. The user device 102 includes, but is not limited to, desktop computing devices and mobile computing devices, such as laptops, tablets, smart phones, and wearable computing devices (e.g., headsets and/or watches). The user 10 may provide the codemixed text 200 to the user device 102 directly via a user input 12. For instance, the user 10 may provide the user input 12 using a keyboard, joystick, smart pen, touch screen, track pad, mouse, joystick, or any other interface in communication with the user device 102. In some examples, the user input 12 includes a voice/speech input captured by a microphone (when explicitly enabled and/or activated by a designated hotword/phrase) of the user device 102. Here, the speech input is converted into digital form and an automatic speech recognizer annotates the speech input into the codemixed text 200. The user device 102 may optionally send the digital speech input to the remote system 140 for conversion by an automatic speech recognizer to annotate the speech into the codemixed text 200.

The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the remote system 140 executes a language identifier 150, 150*b* in lieu of the user device 102 executing the language identifier 150*a*. In the example shown, the language identifier 150*b* executing on the remote system 140 receives the codemixed text 200 (without the language labels 220) from the user device 102, parses/segments the codemixed text 200 into the plurality of tokens 202, and assigns the corresponding language label 220 to each token 202.

In some examples, the language identifier 150*b* executing on the remote system 140 requires about 30 megabytes (MB) of storage while the language identifier 150*a* executing on the user device 102 only requires about one (1) MB of storage. As will become apparent, the language identifier 150*b* associated with the remote system 140 uses lexicon features 210, 210*c* requiring additional memory/storage capacity for predicting languages for each token 202, whereas the language identifier 150*a* associated with the user device 102 may omit the use of lexicon features 210*c* for predicting languages to alleviate memory/storage requirements for the user device 102. Generally, lexicon features 210*c* provide increased performance for short inputs of codemixed text 200 (e.g., three or less tokens) at the cost of requiring additional memory capacity. However, for larger inputs of codemixed text 200, performance degradation is negligible when lexicon features 210*c* are omitted and only character n-gram features 210*a* (and optionally script features 210*b*) are used for language prediction.

In some implementations, a user input 12 to the user device 102 indirectly generates codemixed text 200 received by the language identifier 150. For instance, a user input 12 (e.g., voice or text) may include a navigation query 14 requesting driving directions. Here, the user input 12 may cause a navigation application executing on the user device 102 (or via a web-based application) to send the navigation query 14 to the remote system 140. The navigation query 14 may include a destination address or specify a name of a location or venue the user 10 wants driving directions for (e.g., a suggested route), or the navigation query 14 may not include an address or name of the location or venue—e.g., "Directions to a nearby coffee shop." The remote system 140 may receive the navigation query 14 and generate a search result for the driving directions that includes a navigation instruction along the suggested route having codemixed text 200 stating "Turn right on Rue Monge." Here, the language identifier 150 may receive the codemixed text 200 and assign an English language label 220 to the Turn, right, and on tokens 202, and assign a French language label 220 to the Rue and Monge tokens 202. Accordingly, the user device 102 may receive the driving directions having the codemixed text 200 and use the assigned language labels 220 to audibly notify the user 10 when to Turn right on Rue Monge, while ensuring that the French street, Rue Monge, is pronounced correctly.

In another example, the user input 12 includes a search query 15 to a search engine executing on the remote system 114 that requests search results for dinner specials at an Italian restaurant. The search engine may generate the search result for the requested dinner specials that includes codemixed text 200. For instance, the dinner special including the codemixed text 200 may state "COZZE E VONGOLE AL VINO BIANCO: Mussels and claims with garlic and white wine." Here, the language identifier 150 may receive the codemixed text 200 and assign an Italian language label 220 to the COZZE, E, VONGOLE, AL, VINO, and BIANCO tokens 202, and assign an English language label 220 to the remaining tokens 202. Accordingly, the user device 102 may receive the dinner special having the codemixed text 200 and use the assigned language labels 220 to audibly inform the user 10 of the requested dinner special while pronouncing the Italian words correctly.

In the example shown, the language identifier 150 includes a parser 160, an extractor 170, a feed-forward neural network model 300, and an encoder 190 configured to assign the corresponding language label 220 to each respective token 202 of the codemixed text 200. The parser 160 receives the codemixed text 200 containing multiple languages and segments/parses the codemixed text 200 into a plurality of tokens 202. Each token 202 includes at least one character (e.g., letter or script) and is delineated from any adjacent tokens 202 by a space. The extractor 170 receives each token 202 of the codemixed text 200 from the parser 160 and extracts one or more features 210, 210*a-c* from each token 202. The features 210 may include at least one of character features 210*a*, script features 210*b*, or lexicon features 210*c*.

Figure 2B:
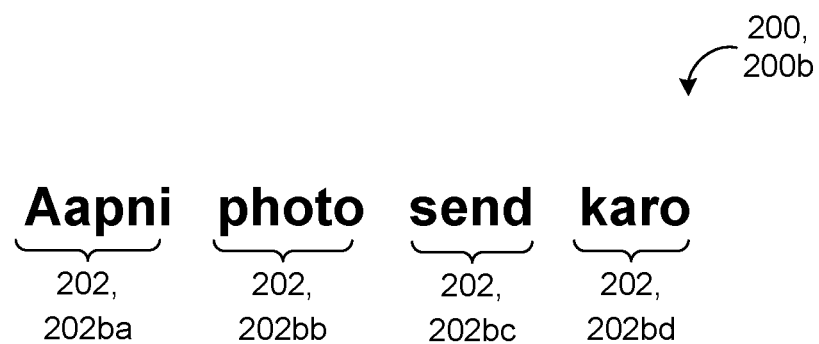

Referring to FIGS. 2A and 2B, the codemixed text 200 may include either one of intra-mix text 200*a* or inter-mix text 200*b*. Intra-mix text 200*a* includes a sentence starting with one language and switching to another language, while inter-mix text 200*b* includes a sentence having an overall first language with words from a second language dispersed in the middle. In the example shown, the intra-mix text 200*a* includes the sentence Dame ese book that you told me about (English translation: "Give me this book that you told me about"). The parser 160 may parse/segment the intra-mix text 200*a* into a plurality of tokens 202, 202*aa*-202*ah*, where the Dame token 202*aa* and the ese token 202*ab* are associated with Spanish and the remaining tokens 202*ac*-202*ah* are associated with English. The example of inter-mix text 200*b* includes the sentence Aapni photo send karo (English translation: "Send your photo"). Here, the parser 160 may parse/segment the inter-mix text 200*b* into a plurality of tokens 202, 202*ba*-202*bd*, where the first and last Aapni and karo tokens 202*ba*, 202*bd* are associated with Hindi and the middle photo and send tokens 202*bb*, 202*bc* are associated with English.

In some examples, extracting the character features 210*a* includes identifying all character n-gram features in the corresponding token 202. An n-gram is a sequence of n consecutive characters, e.g., letters or symbols, and includes an order of size associated with the number characters in the n-gram. For example, a 1-gram (or unigram) includes one character; a 2-gram (or bigram) includes two characters; a 3-gram (or trigram includes three characters; and a 4-gram (or quadrigram) includes four characters. Here, the extractor 170 may identify at least one of character unigram features, character bigram features, character trigram features, or character quadrigram features in the corresponding token 202. For each character n-gram feature 210*a* identified in the corresponding token 202, the extractor 170 is configured to calculate a corresponding frequency of the character n-gram feature 210*a* in the token 202 by dividing a corresponding number of occurrences for the character n-gram in the corresponding token 202 by a total number of character n-grams identified from the corresponding token 202. For example, if the token 202 is banana, then one of the extracted character trigrams 210*a* is ana and the corresponding frequency for ana is 2/6. Here, the token 202 banana includes a total of six character trigrams 210*a* due to an additional boundary symbol appended to both ends of the token 202.

The extractor 170 may use feature hashing to control a vocabulary size V of the extracted character features 210*a* from a corresponding token 202 and avoid storing a large string-to-id map in the memory hardware 106, 146 during run time. Here, a feature id for a corresponding n-gram string x is given by $H(x) \mod V_g$, where H is a well-behaved hash function. The vocabulary size V may be set equal to 1000, 1000, 5000, 5000 for n equal to 1, 2, 3, 4, respectively. In some implementations, extracting character features 210*a* from each corresponding token 202 includes extracting character features 210*a* from any adjacent tokens 202. For instance, the extractor 170 may extract character features 210*a* from previous and following tokens 202, as well as from the respective token 202, in order to provide additional context for the respective token 202.

In some implementations, extracting script features 210*b* from a corresponding token 202 provides a strong correlation to a specific language. For instance, Hiragana script is only used in Japanese and Hangul script is only used in Korean. The language identifier 150 may store a character script library 172 in data storage 180 (residing on the memory hardware 106, 146) that maps different character script types 174 to corresponding unicode values associated with character script features 210*b*. The number of character script types 174 may correspond to a vocabulary size V of the script features 210*b*. In some examples, the character script library 172 is trained on twenty-eight (28) different script types 174. The extractor 170 may output a final vector for each corresponding token 202 that contains normalized counts of all character script features 210 identified in the corresponding token 202. Accordingly, the extractor 170 may identify all character script features 210*b* in a corresponding token 202, determine a unicode value for each identified character script features 210*a*, and assign a corresponding character script type 174 for the identified character script feature 210*b* based on the corresponding unicode value.

Lexicon features 210*c* are both prevalent and highly predictive for predicting languages associated with tokens 202. Especially for smaller codemixed text 200 inputs (e.g., four tokens or less), lexicon features 210*c* may provide strong signals for per-token language identification. The use of lexicon features 210*c* are not suitable, however, for predicting languages for informal words, such as misspelled words, abbreviated words, or slang, all of which commonly occur in informal contexts. In some examples, the language identifier 150 stores a lexicon library 182 in the data storage 180 that includes a pool of word entries 184 and corresponding language probability distributions 186 for each word entry 184 in the pool of word entries 184. For instance, the word entry 184 for the word mango includes a corresponding language probability distribution 186 indicating that mango occurs 50% of the time in English contexts and 13% of the time in Spanish contexts. The lexicon library 182 may contain about four million word entries 184 and cover one-hundred and ten (110) different languages. Thus, the lexicon features 210*c* may include a corresponding vocabulary size V equal to the number of languages (e.g., 110 languages) in the lexicon library 182. Accordingly, the large lexicon library 182 necessitates increased memory/storage requirements that may only be suitable for use by the language identifier 150*b* when implemented on the remote system 140. In some examples, the lexicon library 182 is trained on a public corpus of text such as Wikipedia pages.

In some implementations, the extractor 170 extracts lexicon features 210*c* by querying the lexicon library 182 to determine whether a corresponding token 202 matches one of the word entries 184 in the lexicon library 182. In these examples, when the corresponding token 202 matches one of the word entries 184, the extractor 170 retrieves the corresponding language probability distribution 186 for the matching word entry 184 for use by the neural network model 300. The extracted lexicon features 210*c* may be set to one (1) for all non-zero probabilities. Additionally, if the token 202 is associated with only one language, the extractor 170 may provide a one-hot vector to the neural network model 300 whose only non-zero value is a position indicating the corresponding language associated with the token 202. As with the extracted character n-gram features 210*a*, extracting lexicon features 210*c* from each corresponding token 202 may include extracting lexicon features 210*c* from any adjacent tokens 202. For instance, the extractor 170 may extract lexicon features 210*c* from previous and following tokens 202, as well as from the respective token 202, in order to provide additional context for the respective token 202. An additional prefix lexicon library for language distributions of 6-gram character prefixes may also be constructed and stored in the data storage 180. The extractor 170 may similarly query the additional prefix lexicon library to determine whether a corresponding token 202 matches one of the 6-gram character prefix entries, and when a match occurs, retrieve a corresponding language probability distribution for the matching 6-gram character prefix entry. The extractor 170 may optionally query the prefix lexicon library when no matching word entries 184 are found in the lexicon library 182.

For each token 202 of the codemixed text 200, the neural network model 300 receives the extracted features 210 from the respective token 202 as feature inputs 210 and predicts a probability distribution 400 over possible languages for the respective token 202 using the feature inputs 210. Accordingly, the feature inputs 210 received by the neural network model 300 may merge one or more of the character n-gram features 210*a*, character script features 210*b*, or lexicon features 210*c* together for predicting the probability distribution 400 for the respective token 202. The feed-forward neural network model 300 may be referred to as a language identifier model.

Figure 3:
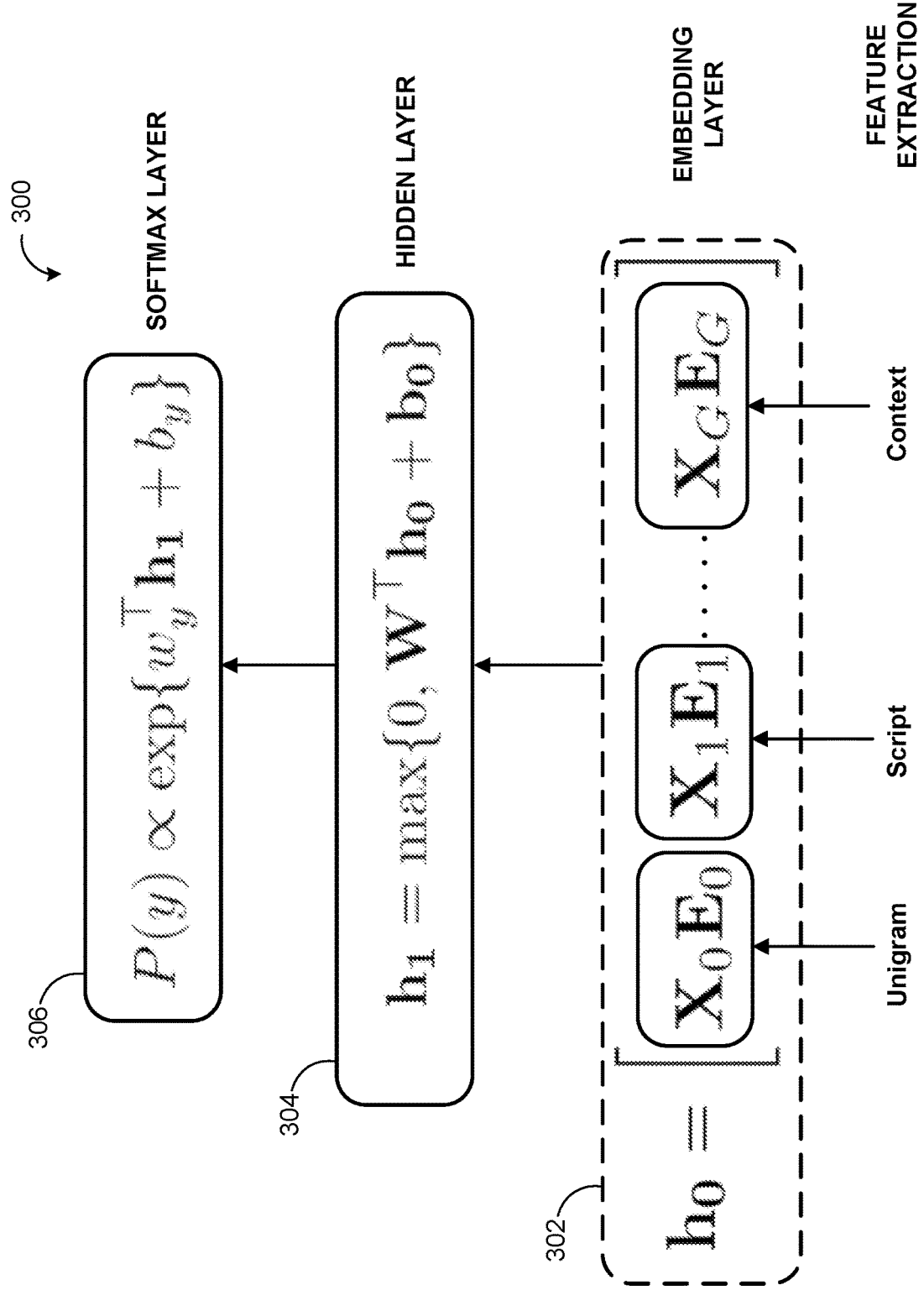
FIG. 3 schematically illustrates an example feed-forward neural network model configured to predict probability distributions over possible languages for tokens in codemixed text.

FIG. 3 shows an example of the feed-forward neural network model 300 of FIG. 1. The feed-forward neural network model 300 includes an embedding layer 302, a hidden layer 304 interconnected with the embedding layer 302 in a feed-forward manner, and an output layer 306 interconnected with the hidden layer 304 in the feed-forward manner. In the example shown, the output layer 306 is a softmax layer. The embedding layer 302 is configured to receive the feature inputs 210 from one or more of the feature groups g of character features 210a, script features 210b, or lexicon features 210c. The embedding layer 302 may represent the feature input 210 for each group g by a sparse matrix $X_g$ as follows:

$$X_g \in R^{F_g \times V_g} \quad (1)$$

where $F_g$ is a number of feature templates and $V_g$ is the vocabulary size of the corresponding feature group. The embedding layer 302 is further configured to map the sparse matrix of each respective feature group g (e.g., feature input 210) to dense embedding vectors, resulting in a learned embedding matrix $E_g$ for each feature group g (e.g., feature input 210) that may be represented as follows:

$$E_g \in R^{F_g \times D_g} \quad (2)$$

Lastly, the embedding layer 302 is configured to concatenate each learned embedding matrix $E_g$ corresponding to each received feature input 210 (e.g., feature group g) to form the embedding layer $h_0 = vec[X_g E_g | \forall_g]$. A final size of the embedding layer 302 may include a sum of all embedded feature sizes. The feed-forward neural network model 300 may use both discrete and continuous features.

The hidden layer 304 is configured to receive the embedding layer 302 and apply a rectified linear unit (ReLU) of the embedding layer 302. The hidden layer 304 may include a size 256 and the ReLU may be applied over hidden layer outputs. The final output layer 306 (e.g., softmax layer) is configured to output a probability for each possible language for each respective token 202. Here, the probability for each possible language output from the output layer 306 corresponds to the probability distribution 400 over possible languages for each respective token 202 of the codemixed text. The feed-forward neural network 300 may be trained per-token with cross-entropy loss.

Figure 4:
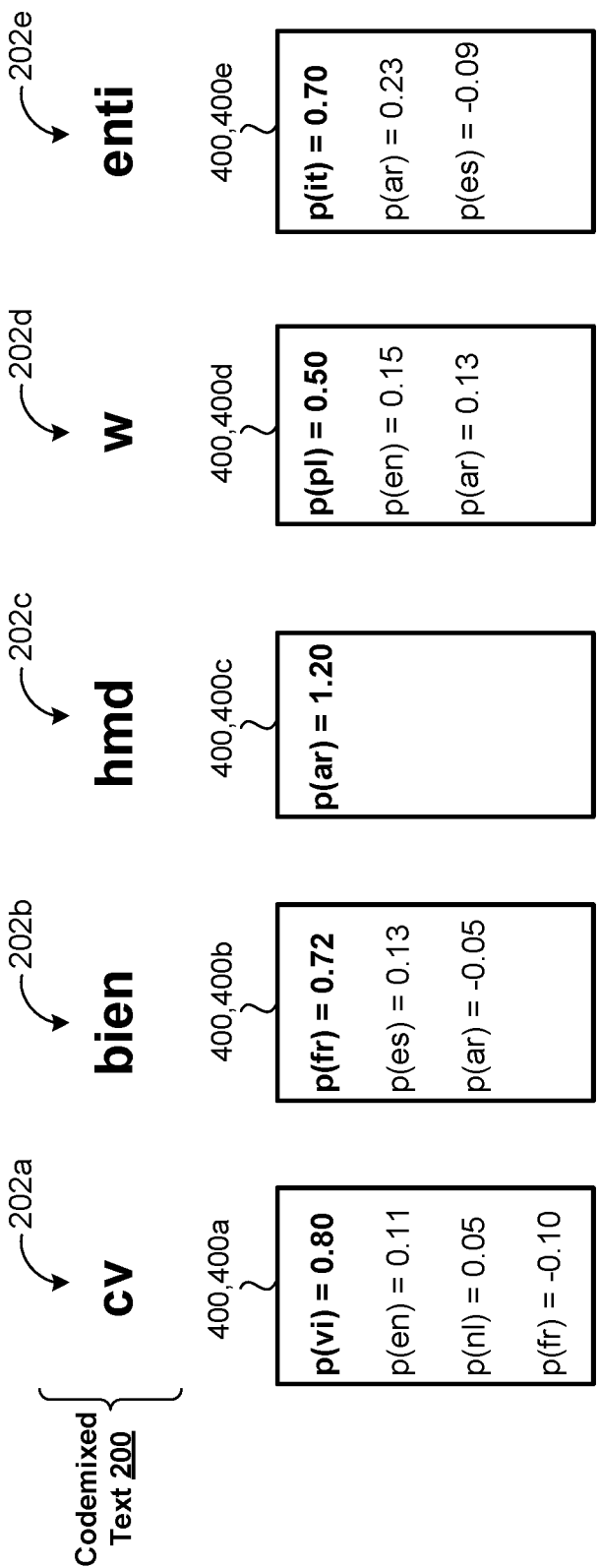
FIG. 4 schematically illustrates a plurality of probability distributions over possible languages for corresponding tokens of codemixed text.

FIG. 4 shows example probability distributions 400, 400a-400e over possible languages output by the feed-forward neural network model 300 for each of a plurality of tokens 202, 202a-e of codemixed text 200. In the example shown, the codemixed text 200 reciting "cv bien hmd w enti" is parsed into respective tokens 202a-e for cv, bien, hmd, w, and enti. The probability distribution 400a for the cv token 202a includes probability scores p of 0.80, 0.11, 0.05, –0.10 for Vietnamese (vi), English (en), Dutch (nl), and French (fr), respectively. The probability distribution 400b for the bien token 202b includes probability scores p of 0.72, 0.13, –0.05 for French (fr), Spanish (es), and Arabic (ar), respectively. The probability distribution 400c for the hmd token 202c includes a single probability score p of 1.20 for Arabic (ar). The probability distribution 400d for the w token 202d includes probability scores p of 0.50, 0.15, 0.13 for Polish (pl), English (en), and Arabic (ar), respectively. The probability distribution 400e for the enti token 202e includes probability scores of 0.70, 0.23, –0.09 for Italian (it), Arabic (ar), and Spanish (es), respectively.

Simply picking the language having the highest probability score from each probability distribution 400 for assignment to the associated token 202 is susceptible to over-predicting too many languages in a single sentence. In fact, testing revealed that picking languages in this manner over-predicted an average of 1.7 languages per sentence of monolingual text inputs. Since the neural network model 300 uses a context window including only the previous, current, and next tokens, the neural network model's 300 view on an entire input sentence is limited. In the example shown, picking the language with the highest probability score for each token 202 predicts the codemixed text 200 to include languages of Vietnamese, French, Arabic, Polish, and Italian. To put another way, if the encoder 190 simply picks the language associated with the highest probability score from each probability distributions 400a-400e for assigning corresponding language labels 220, the encoder 190 would assign each token 202a-202e of the codemixed text 200 a different language label 220. In this case, it is very unlikely that a user would input codemixed text containing five different languages.

To avoid over-predicting too many languages in a single input of text, whether codemixed or monolingual, implementations of the present disclosure use a greedy decoding strategy 500 that applies an assignment constraint (e.g., global constraint) for assigning per-token language labels to input text. FIG. 1 shows the encoder 190 receiving probability distributions 400 over possible languages output from the neural network model 300 for corresponding tokens 202 in codemixed text 200, as well as an assignment constraint 510 that assumes at least one language assigned to at least one token 202 of the codemixed text 200. The assignment constraint 510 includes at least one fixed set of language pairs permissible for assignment to each token of the codemixed text 200. The language identifier 150 may have access to one-hundred and sixteen (116) fixed sets of language pairs that primary include a combination of English and a non-English language. Accordingly, the encoder 190 executes the greedy decoding strategy 500 to assign the language label 220 to each token 202 of the codemixed text 200 by selecting the language having a greatest probability distribution for the respective token 202 relative to any adjacent tokens 202 based on the assignment constraint 510.

Figure 5A:
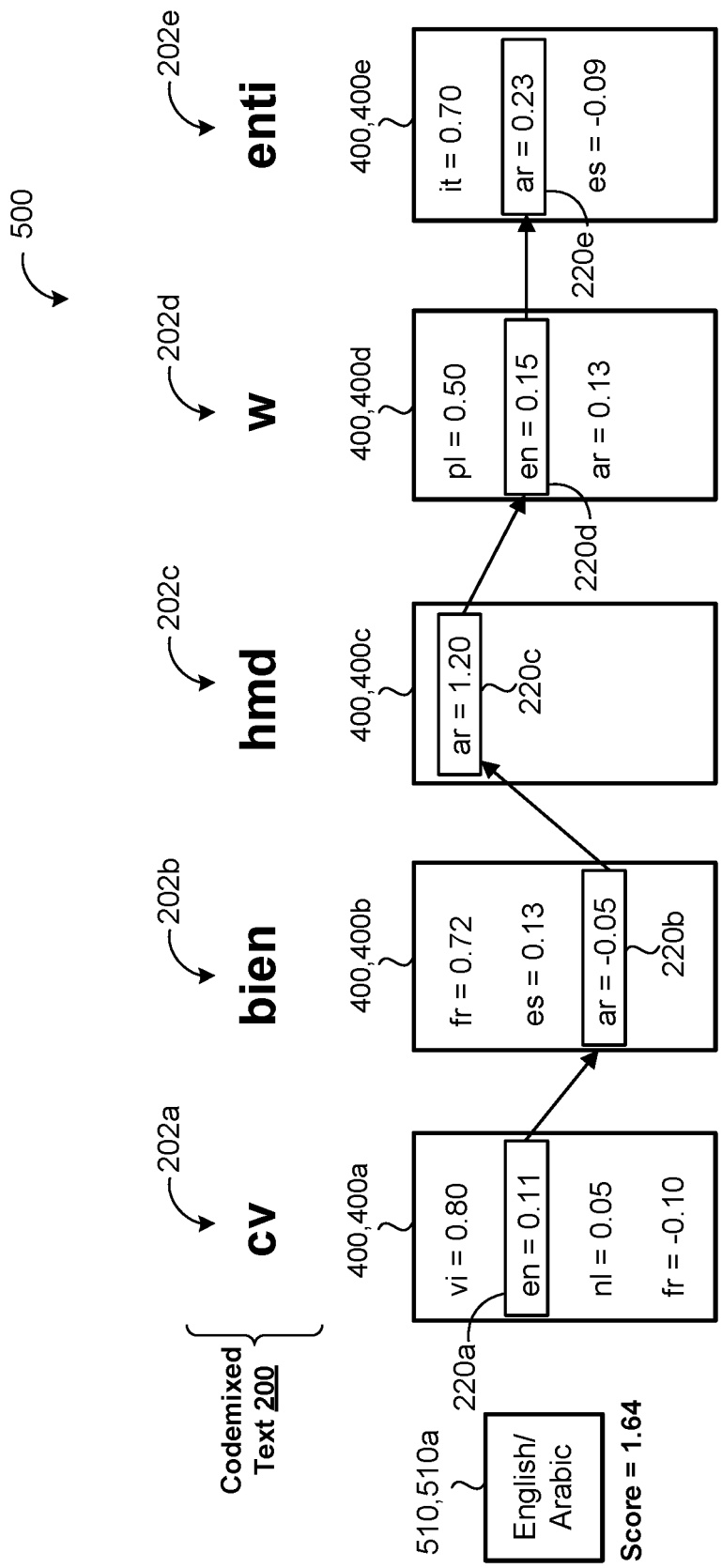
FIGS. 5A and 5B schematically illustrate an example greedy decoding strategy for assigning language labels to tokens of codemixed text.
Figure 5B:
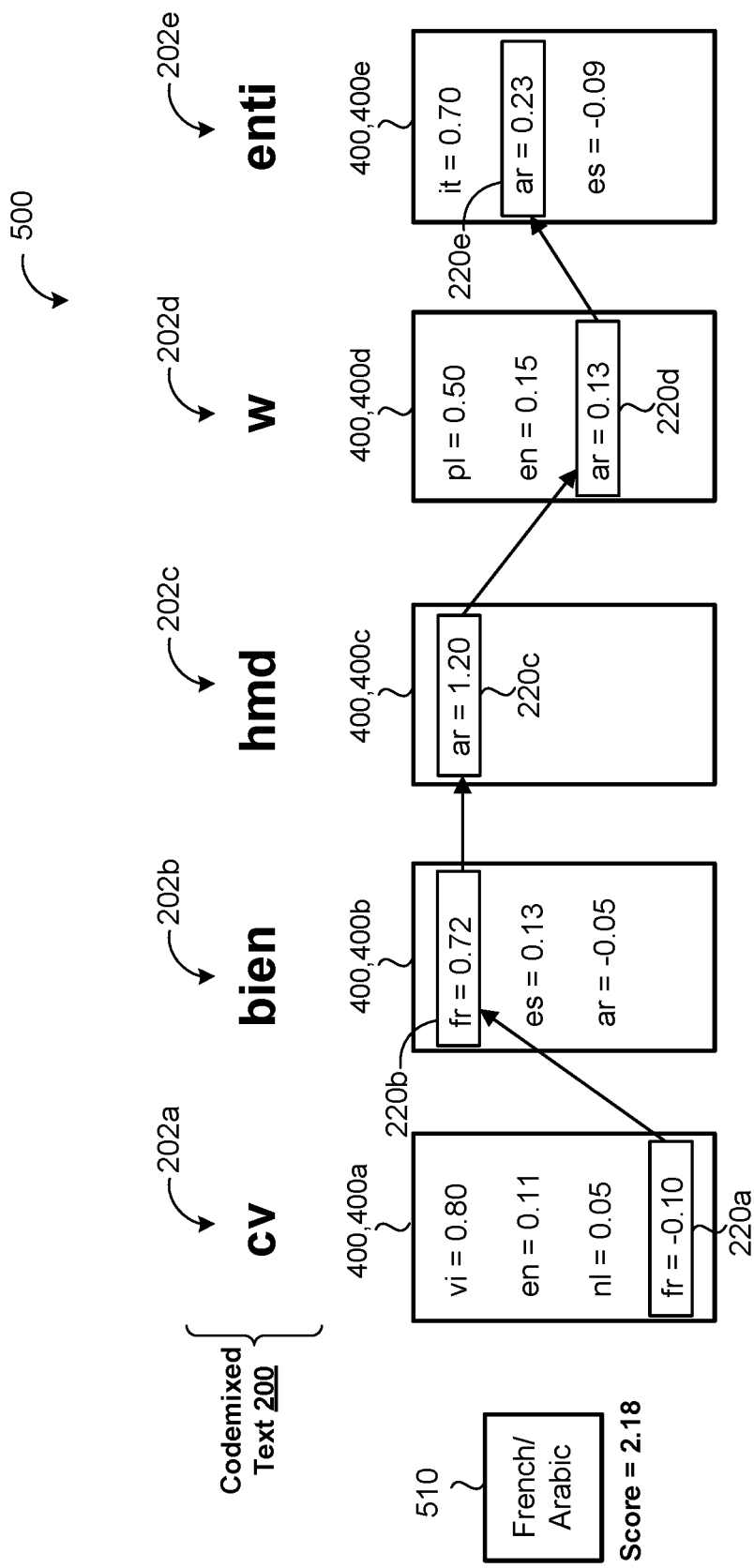

FIGS. 5A and 5B show the encoder 190 executing the greedy decoding strategy 500 to assign language labels 220 to each of the plurality of tokens 202a-e of the codemixed text 200 of FIG. 4 based on an assignment constraint 510, 510a-b including two fixed sets of different language pairs (English/Arabic and French/Arabic). Accordingly, the assignment constraint 510 applied in the example assumes that at least one language assigned to at least one token 202 in the codemixed text 200 is English or French.

Referring to FIG. 5A, the strategy 500 applies the assignment constraint 510a including the first fixed set of language pairs for English and Arabic. Here, the assignment constraint 510a permits the strategy 500 to only select the language from the corresponding English/Arabic language pair that has a greatest probability (e.g., probability score p) in the probability distribution 400 over possible languages for each respective token 202 of the codemixed text 200. In the example shown, the strategy 500 assigns an English language label 220a for the cv token 202a since Arabic is not listed in the associated probability distribution 400a and assigns Arabic language labels 220b, 220c for the bien and hmd tokens 202b, 202c since English is not listed in the associated probability distributions 400b, 400c. As the probability distribution 400d for the w token 202d lists both English (en) and Arabic (ar) as possible languages, the strategy 500 assigns an English language label 220*d* to the w token 202*d* since the probability score of 0.15 for English is greater than the probability score of 0.13 for Arabic. Lastly, the strategy 500 assigns an Arabic language label 220*e* to the enti token 202*e* since English is not listed in the associated probability distribution 400*e*.

After assigning the language labels 220*a*-220*e* constrained by the allowed English/Arabic language pair, the greedy decoding strategy 500 calculates a score associated the assignment constraint 510*a* by summing the probability scores associated with the assigned language labels 220*a*-*e* (e.g., the selected languages for each token 202*a*-*e*). In the example shown, the assignment constraint 510*a* including the language pair for English and Arabic includes a score equal to 1.64.

Referring to FIG. 5B, the greedy decoding strategy 500 applies the assignment constraint 510*b* including the second set of fixed language pairs for French and Arabic. Now, the greedy decoding strategy 500 is only permitted to select the language from the corresponding French/Arabic language pair of the assignment constraint 510*b* that has a greatest probability (e.g., probability score p) in the probability distribution 400 over possible languages for each respective token 202 of the codemixed text 200. FIG. 5B shows the strategy 500 assigning a French language label 220*a* to the cv token 202*a* since Arabic is not listed in the associated probability distribution 400*a*. As the probability distribution 400*b* for the bien token 202*b* lists both French (en) and Arabic (ar) as possible languages, the strategy 500 assigns a French language label 220*b* to the bien token 202*b* since the probability score of 0.72 for French is greater than the probability score of –0.05 for Arabic. FIG. 5B further shows the greedy decoding strategy 500 assigning Arabic language labels 220*c*, 220*d*, 220*e* for the hmd, w, and enti tokens 202*c*, 202*d*, 202*e* since French is not listed in the associated probability distributions 400*c*, 400*d*, 400*e*.

Comparing the language predictions for each token 202 of the codemixed text 200 under the different assignment constraints 510*a*, 510*b* reveals that only the Arabic language predictions for the hmd and enti tokens 202*c*, 202*e* remains unchanged, while the language predictions for the cv, bien, and w tokens 202*a*, 202*b*, 202*d* differ. For instance, the strategy 500 predicts French for each of the cv and bien tokens 202*a*, 202*b* when applying the assignment constraint 510*b* (FIG. 5B) associated with the French/Arabic language pair and predicts English for the cv token 202*a* and Arabic for the bien token 202*b* when applying the assignment constraint 510*a* (FIG. 5A) associated with the English/Arabic language pair.

After assigning the language labels 220*a*-220*e* constrained by the allowed French/Arabic language pair, the greedy decoding strategy 500 calculates a score associated the assignment constraint 510*b* by summing the probability scores associated with the assigned language labels 220*a*-*e* (e.g., the selected languages for each token 202*a*-*e*). In the example shown, the assignment constraint 510*b* including the language pair for French and Arabic includes a score equal to 2.18. As the allowed language pair for French and Arabic includes a score of 2.18 that is greater than the score of 1.64 associated with the allowed language pair for English and Arabic, the greedy decoding strategy 500 is configured to select the French/Arabic language labels 220*a*-220*e* for assignment to the corresponding tokens 202*a*-202*e*. In other words, assigning language labels 220 to each corresponding token 202 of codemixed text 200 includes assigning a language to each token using languages selected from a fixed set of language pairs associated with a highest score. In the example shown, the greedy decoding strategy 500 assigns the French language labels 220*a*, 220*b* to the cv and bien tokens 202*a*, 202*b* and the Arabic language labels 220*c*, 220*d*, 220*e* to the hmd, w, and enti tokens 202*c*, 202*d*, 202*e*. Accordingly, the language identifier 150 of FIG. 1 may output the codemixed text 200 with the assigned language labels 220 for use by one or more applications 600 executing on the remote system 140 and/or the user device 102.

Figure 6:
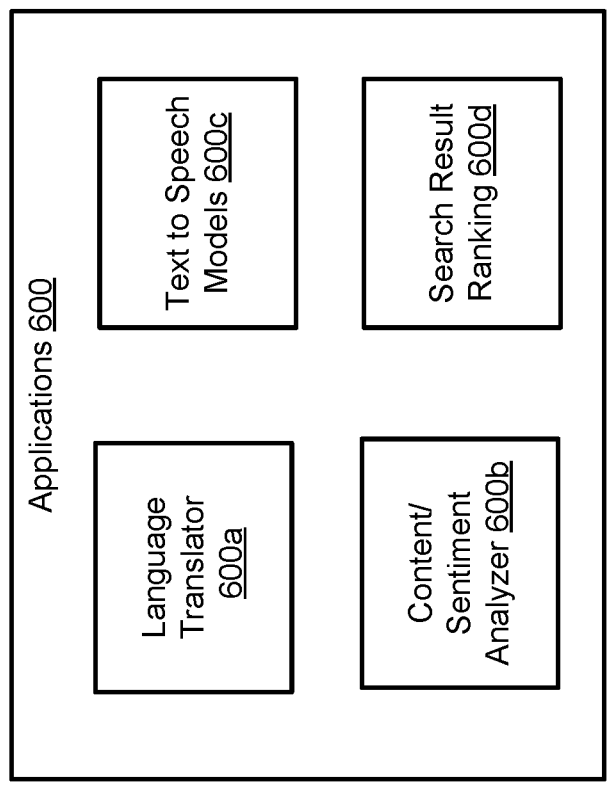
FIG. 6 schematically illustrates example applications using language-labels assigned to tokens of codemixed text.

FIG. 6 provides a non-exhaustive list of example applications/services 600 that may use the per-token language labels 220 assigned to the codemixed text 200 by the language identifier 150. The applications 600 may execute on the remote system 140 and/or the user device 102. A language translator 600*a* (i.e., machine translation applications) uses the per-token language labels 220 assigned to codemixed text 200 for accurately translating words from one language to another. For instance, consider the codemixed text "Como se llama un squirrel en Español" that requests a Spanish translation for the English word squirrel. Without per-token language identification, the language translator 600*a* is left to assume that the entire input is either entirely English or entirely Spanish, and therefore, would not be able to process the requested translation. Content/Sentiment Analyzer applications 600*b* also provide increased performance when using the per-token language labels to analyze the sentiment or mood of codemixed texts for product/service reviews entered by users. Similarly, the scope of the content associated with codemixed text entered on social media posts or message boards may be obtained using the per-token language labels. As discussed above, text to speech models 600*c* used by dialog-based applications, such as navigation applications or voice assistant applications, may use per-token language labels when converting codemixed text to speech so that each and every word is pronounced properly. In addition, search result ranking applications 600*d* may use per-token language labels for search queries containing codemixed text to provide more accurate search rankings.

Referring back to FIGS. 1 and 3, the feed-forward neural network model 300 may inaccurately predict probability distributions over possible languages for tokens associated with informal texts, such as misspellings and slang, when all three types of features (i.e., character n-gram features 210*a*, script features 210*b*, and lexicon features 210*c*) are simply merged together. For instance, when predicting languages for a misspelled word Ennnnglish, the model 300 when merging both character n-gram features 210*a* and lexicon features 210*c* does not make effective use of the character n-gram features 210*a* and predicts a catastrophically wrong probability distribution over possible languages for the token associated with the misspelled word Ennnglish. For example, the model 300 with character n-gram features 210*a* and lexicon features 210*c* may output a probability distribution 400 for the Ennnglish token 202 that includes a top three probability scores p of 0.27, 0.24, 0.18 for Swedish (sv), Danish (dn), and Dutch (nl), respectively. However, by dropping the lexicon features 210*c* from the model 300, the model 300 is able to maximize the use of the Ennnglish token's 202 character n-gram features 210*a* and make an accurate prediction that the misspelled word belongs to the English context. For instance, the feed-forward neural network model 300 without the lexicon features 210*c* includes a top three probability scores p of 0.74, 0.10, 0.06 for English (en), Dutch (nl), and Frisian (fl), respectively.

In addition to making wrong predictions for informal texts (e.g., misspelled words), the prevalent and highly predictive traits associated with lexicon features 210c for per-token language identification also results in dampening to the updating of weights of the character n-gram features 210a during training of the model 300. This dampening during training diminishes the overall utility of the character n-gram features 210a for per-token language identification. In some implementations, to train the feed-forward neural network model 300 to be more robust against noisy inputs, such as informal texts, the language identifier 150 selectively applies a grouped feature dropout strategy that stochastically down-weights lexicon features 210c received as feature inputs during training of the feed-forward neural network model 300. For instance, for each input token 202, after extracting the corresponding features 210, the grouped feature dropout strategy sets the vector associated with lexicon features 210c to zero for a subset of the lexicon features 210c. In this scenario, the model 300 is relying entirely on the extracted character n-gram features 210a for the corresponding token 202 (and also the n-gram features 210a of any adjacent tokens 202).

Figure 7A:
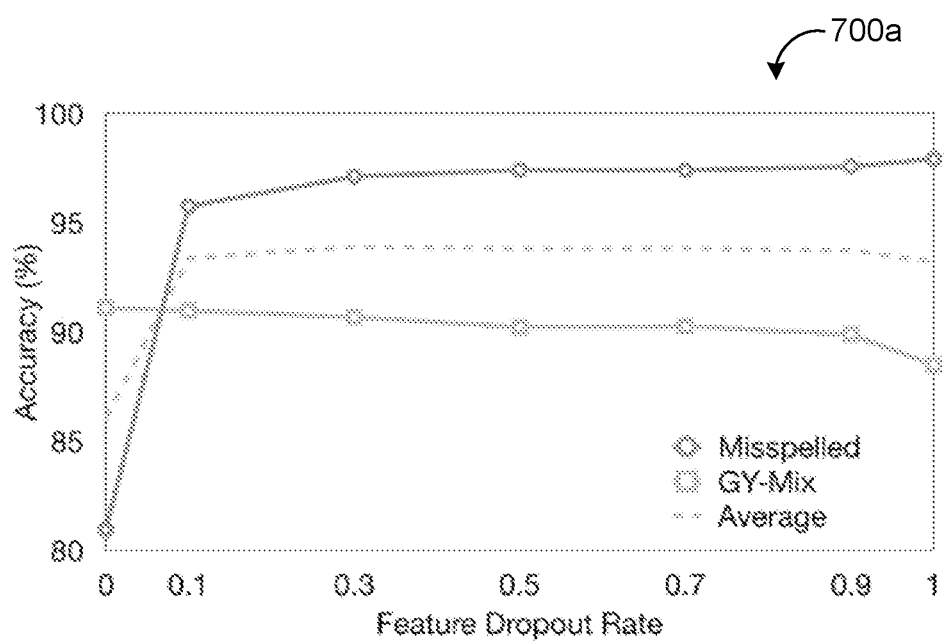
FIG. 7A is a plot illustrating per-token language prediction accuracy for various dropout rates of lexicon features.

In some examples, selectively applying the grouped feature dropout strategy (e.g., a lexicon feature dropout strategy) on a subset of the lexicon features 210c includes a selected dropout rate in which the vector associated with the lexicon features 210c is set to zero. The selected dropout rate may ranges from 20-percent (20%) to 100-percent (100%) in some examples. In other examples, the selected dropout rate ranges from 25-percent (25%) to 75-percent (75%). In some examples, a 30-percent (30%) dropout rate is selected to improve accuracy during training of misspelled tokens. FIG. 7A provides an example plot 700a depicting accuracy of the model 300 for predicting misspelled tokens as well as a corpus of codemixed texts (GY-Mix) based on different dropout rates for lexicon features. The GY-Mix of codemixed texts is sampled from public posts from Google+ and from YouTube that includes three different language pairs of codemixed text: English-Spanish; English-Hindi; and English-Indonesian. The plot 700a shows that misspelled tokens are only accurately predicted 80.5-percent (80.5%) of the time, indicating that n-gram features 210a are not properly trained. Generally, the performance of the model 300 for accurately predicting misspelled tokens is robust across dropout rates from 30% (0.3) to 100% (1), indicating that the dropout strategy is effective and not highly sensitive.

In addition to training the model 300 with the GY-Mix of codemixed texts, the model 300 may also be trained on synthetic codemixed data covering 110 languages and a monolingual corpus (KB-Mono 54) covering 54 languages. Every token in the training set spawns a training instance. The synthetic codemixed data can include samples from public Twitter posts (Twitter-Mix) that codemix between Spanish and English and samples from multilingual web pages (Web-Mix6) that codemix between six languages (Czech, Spanish, Basque, Hungarian, Croatian, Slovac). FIG. 7B provides an example table 700b comparing accuracy of the neural network model with lexicon features (CMX), the neural network model without lexicon features (CMX-small), an EquiLID model, and a LanideNN model for each of the Twitter-Mix, Web-Mix6, and GY-Mix training datasets. The neural network models CMX and CMX-small are both more accurate than the benchmark EquiLID and LanideNN models. The LanideNN model makes a prediction for every character. On average, the neural network model 300 with lexicon features (CMC) is 29.6% more accurate than EquiLID (93.5% vs. 73.9%) and achieves evendrop greater accuracy than the LanideNN model. FIG. 7C provides an example table 700c comparing accuracy of the neural network model with lexicon features (CMX), the neural network model without lexicon features (CMX-small), the EquiLID model, the LanideNN model, and a Langid.py model for sentence-level language predictions on the KB-Mono54 training dataset.

Figure 8:
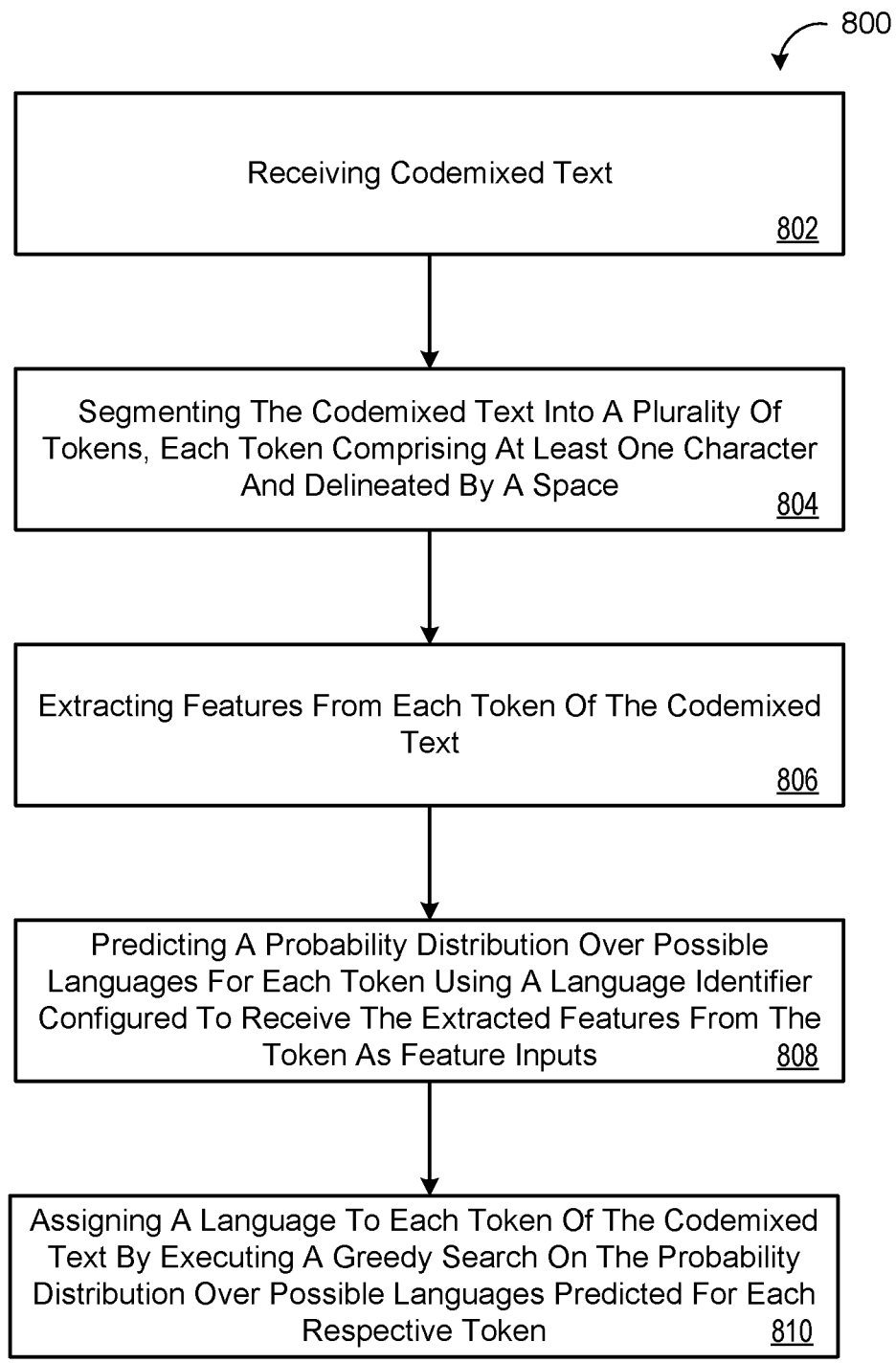
FIG. 8 is a flowchart of an example arrangement of operations for a method of per-token language identification in codemixed text.

FIG. 8 is a flowchart of an example arrangement of operations for a method 800 of per-token language identification in codemixed text. The data processing hardware 104, 144 may execute the operations for the method 800 by executing instructions stored on the memory hardware 106, 146. At operation 802, the method 800 includes receiving, at the data processing hardware, codemixed text 200. The codemixed text 200 contains multiple languages and may be either one of intra-mix text 200a or inter-mix text 200b. At operation 804, the method 800 includes segmenting/parsing, by the data processing hardware, the codemixed text 200 into a plurality of tokens 202. Each token includes at least one character and is delineated from any adjacent tokens by a space.

At operation 806, for each token 202 of the codemixed text 200, the method 800 includes extracting, by the data processing hardware, features 210 from the token 202. The features may include at least one of character features 210a, script features 210b, or lexicon features 210c. At operation 808, for each token 202 of the codemixed text 200, the method 800 includes predicting, by the data processing hardware, a probability distribution 400 over possible languages for the token 202 using a language identifier model 300 (i.e., feed-forward neural network model) configured to receive the extracted features 210 from the token 202 as feature inputs 210. The language identifier model 300 may include an embedding layer 302, a hidden layer 304 interconnected to the embedding layer 302 in a feed-forward manner, and an output layer 306 interconnected with the hidden layer 304 in the feed-forward manner. The embedding layer 302 is configured to: receive the feature inputs 210, each including a sparse matrix; map the sparse matrix of each respective feature input 210 to dense embedding vectors, resulting in a learned embedding matrix; and concatenate each learned embedding matrix corresponding to each received feature input 210. The hidden layer 304 is configured to receive the embedding layer 302 and apply a rectified linear unit (ReLU) of the embedding layer 302. The output layer 306 is configured to output a probability distribution 400 for each possible language for each respective token 202. The output layer 306 may include a softmax layer.

At operation 808, the method 800 includes assigning, by the data processing hardware, a language to each token 202 of the codemixed text 200 by executing a greedy search on the probability distribution over the possible languages predicted for each respective token 202. IN some examples the method receives an assignment constraint 510 that assumes at least one language assigned to at least one token 202 of the codemixed text 200. Here, the data processing hardware may execute a greedy decoding algorithm that assigns the language to each token 202 by selecting the language having a greatest probability distribution 400 for the respective token relative to any adjacent tokens 202 based on the assignment constraint 510. The assignment constraint 510 may include at least one fixed set of language pairs permissible for assignment to each token of the codemixed text 200.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 9:
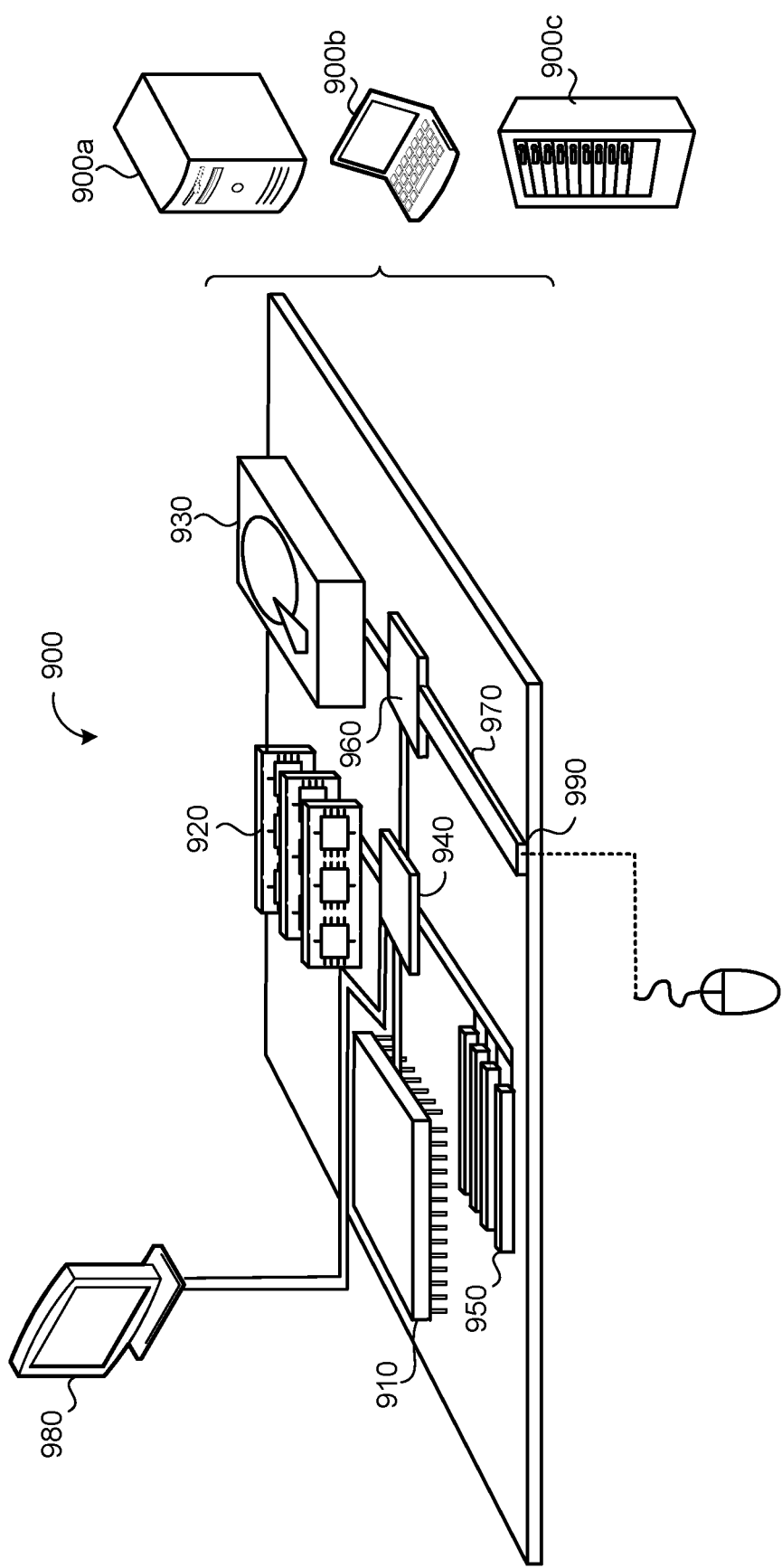
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910 (e.g., data processing hardware 104, 144), memory 920 (e.g., memory hardware 106, 146), a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for identifying codemixed text, the method comprising:
   receiving, at data processing hardware, codemixed text;
   segmenting, by the data processing hardware, the codemixed text into a plurality of tokens, each token comprising at least one character and delineated from any adjacent tokens by a space;
   for each token of the codemixed text:
      extracting, by the data processing hardware, features from the token; and
      predicting, by the data processing hardware, a probability distribution over possible languages for the token using a language identifier model configured to receive the extracted features from the token as feature inputs;
   assigning, by the data processing hardware, a language to each token of the codemixed text by executing a greedy search on the probability distribution over the possible languages predicted for each respective token; and
   receiving, at the data processing hardware, an assignment constraint that assumes at least one language assigned to at least one token of the codemixed text,
   wherein assigning the language to each token of the codemixed text comprises selecting the language having a greatest probability distribution for the respective token relative to any adjacent tokens based on the assignment constraint.

2. The method of claim 1, further comprising, for each token of the codemixed text:
   extracting, by the data processing hardware, features from any adjacent tokens,
   wherein the language identifier model is further configured to receive the extracted features from the adjacent tokens as feature inputs for predicting the probability distribution over possible languages for the corresponding token.

3. The method of claim 1, wherein the feature inputs comprise at least one of character features, script features, or lexicon features.

4. The method of claim 1, wherein the at least one assumed language of the assignment constraint is English or French.

5. The method of claim 1, wherein the assignment constraint comprises at least one fixed set of language pairs permissible for assignment to each token of the codemixed text.

6. A method for identifying codemixed text, the method comprising:
   receiving, at data processing hardware, codemixed text;
   segmenting, by the data processing hardware, the codemixed text into a plurality of tokens, each token comprising at least one character and delineated from any adjacent tokens by a space;
   for each token of the codemixed text:
      extracting, by the data processing hardware, features from the token by:
         identifying all character n-gram features in the corresponding token; and
         for each character n-gram feature, calculating a corresponding frequency of the character n-gram feature in the corresponding token by dividing a corresponding number of occurrences for the character n-gram in the corresponding token by a total number of character n-grams identified from the corresponding token; and
      predicting, by the data processing hardware, a probability distribution over possible languages for the token using a language identifier model configured to receive the extracted features from the token as feature inputs; and
   assigning, by the data processing hardware, a language to each token of the codemixed text by executing a greedy search on the probability distribution over the possible languages predicted for each respective token.

7. The method of claim 6, wherein identifying all character n-gram features comprises identifying at least one of character unigram features, character bigram features, character trigram features, or character quadrigram features in the corresponding token.

8. A method for identifying codemixed text, the method comprising:
   receiving, at data processing hardware, codemixed text;
   segmenting, by the data processing hardware, the codemixed text into a plurality of tokens, each token comprising at least one character and delineated from any adjacent tokens by a space;
   for each token of the codemixed text:
      extracting, by the data processing hardware, features from the token by:
         identifying all character script features in the corresponding token;

determining a unicode value for each identified character script feature; and assigning each identified character script feature a corresponding character script type from a set of possible character script types based on the corresponding unicode value for the identified character script feature; and predicting, by the data processing hardware, a probability distribution over possible languages for the token using a language identifier model configured to receive the extracted features from the token as feature inputs; and assigning, by the data processing hardware, a language to each token of the codemixed text by executing a greedy search on the probability distribution over the possible languages predicted for each respective token.

9. The method of claim 8, wherein the assigned character script type is associated with only one language.

10. A method for identifying codemixed text, the method comprising:

receiving, at data processing hardware, codemixed text;

segmenting, by the data processing hardware, the codemixed text into a plurality of tokens, each token comprising at least one character and delineated from any adjacent tokens by a space;

for each token of the codemixed text:
extracting, by the data processing hardware, features from the token by:
querying a lexicon library stored in memory hardware in communication with the data processing hardware, the lexicon library comprising a pool of word entries and corresponding language probability distributions for each word entry in the pool of word entries;
determining whether the token matches one of the word entries of the lexicon library; and
when the token matches one of the word entries of the lexicon library, retrieving the corresponding language probability distribution for the word entry that matches the token; and
predicting, by the data processing hardware, a probability distribution over possible languages for the token using a language identifier model configured to receive the extracted features from the token as feature inputs; and assigning, by the data processing hardware, a language to each token of the codemixed text by executing a greedy search on the probability distribution over the possible languages predicted for each respective token.

11. A method for identifying codemixed text, the method comprising:

receiving, at data processing hardware, codemixed text;

segmenting, by the data processing hardware, the codemixed text into a plurality of tokens, each token comprising at least one character and delineated from any adjacent tokens by a space;

for each token of the codemixed text:
extracting, by the data processing hardware, features from the token; and
predicting, by the data processing hardware, a probability distribution over possible languages for the token using a language identifier model configured to receive the extracted features from the token as feature inputs; and assigning, by the data processing hardware, a language to each token of the codemixed text by executing a greedy search on the probability distribution over the possible languages predicted for each respective token, wherein the language identifier model includes a feed-forward neural network comprising:
an embedding layer configured to:
receive the feature inputs, each feature input comprising a sparse matrix;
map the sparse matrix of each respective feature input to dense embedding vectors, resulting in a learned embedding matrix; and
concatenate each learned embedding matrix corresponding to each received feature input;
a hidden layer interconnected with the embedding layer in a feed-forward manner, the hidden layer configured to:
receive the embedding layer; and
apply a rectified linear unit (ReLU) of the embedding layer; and
an output layer interconnected with the hidden layer in the feed-forward manner, the output layer configured to output a probability for each possible language for each respective token.

12. The method of claim 11, wherein the output layer comprises a softmax layer.

13. A method for identifying codemixed text, the method comprising:

receiving, at data processing hardware, codemixed text;

segmenting, by the data processing hardware, the codemixed text into a plurality of tokens, each token comprising at least one character and delineated from any adjacent tokens by a space;

for each token of the codemixed text:
extracting, by the data processing hardware, features from the token; and
predicting, by the data processing hardware, a probability distribution over possible languages for the token using a language identifier model configured to receive the extracted features from the token as feature inputs, wherein the language identifier model executes a lexicon feature dropout strategy during training that drops a sub-set of extracted lexicon features as feature inputs; and assigning, by the data processing hardware, a language to each token of the codemixed text by executing a greedy search on the probability distribution over the possible languages predicted for each respective token.

14. A system for identifying codemixed text, the system comprising:

data processing hardware; and memory hardware in communication with the data processing hardware, the memory hardware storing instructions that when executed by the data processing hardware cause the data processing hardware to perform operations comprising:
receiving codemixed text;
segmenting the codemixed text into a plurality of tokens, each token comprising at least one character and delineated from any adjacent tokens by a space;
for each token of the codemixed text:
extracting features from the token; and
predicting a probability distribution over possible languages for the token using a language identifier model configured to receive the extracted features from the token as feature inputs;
assigning a language to each token of the codemixed text by executing a greedy search on the probability distribution over the possible languages predicted for each respective token; and receiving an assignment constraint that assumes at least one language assigned to at least one token of the codemixed text, wherein assigning the language to each token of the codemixed text comprises selecting the language having a greatest probability distribution for the respective token relative to any adjacent tokens based on the assignment constraint.

15. The system of claim 14, wherein the operations further comprise, for each token of the codemixed text:

extracting features from any adjacent tokens, wherein the language identifier model is further configured to receive the extracted features from the adjacent tokens as feature inputs for predicting the probability distribution over possible languages for the corresponding token.

16. The system of claim 14, wherein the feature inputs comprise at least one of character features, script features, or lexicon features.

17. The system of claim 14, wherein the at least one assumed language of the assignment constraint is English or French.

18. The system of claim 14, wherein the assignment constraint comprises at least one fixed set of language pairs permissible for assignment to each token of the codemixed text.

19. A system for identifying codemixed text, the system comprising:

data processing hardware; and memory hardware in communication with the data processing hardware, the memory hardware storing instructions that when executed by the data processing hardware cause the data processing hardware to perform operations comprising:

receiving codemixed text;

segmenting the codemixed text into a plurality of tokens, each token comprising at least one character and delineated from any adjacent tokens by a space;

for each token of the codemixed text:

extracting features from the token by:

identifying all character n-gram features in the corresponding token; and for each character n-gram feature, calculating a corresponding frequency of the character n-gram feature in the corresponding token by dividing a corresponding number of occurrences for the character n-gram in the corresponding token by a total number of character n-grams identified from the corresponding token; and predicting a probability distribution over possible languages for the token using a language identifier model configured to receive the extracted features from the token as feature inputs; and assigning a language to each token of the codemixed text by executing a greedy search on the probability distribution over the possible languages predicted for each respective token.

20. The system of claim 19, wherein identifying all character n-gram features comprises identifying at least one of character unigram features, character bigram features, character trigram features, or character quadrigram features in the corresponding token.

21. A system for identifying codemixed text, the system comprising:

data processing hardware; and memory hardware in communication with the data processing hardware, the memory hardware storing instructions that when executed by the data processing hardware cause the data processing hardware to perform operations comprising:

receiving codemixed text;

segmenting the codemixed text into a plurality of tokens, each token comprising at least one character and delineated from any adjacent tokens by a space;

for each token of the codemixed text:

extracting features from the token by:

identifying all character script features in the corresponding token;

determining a unicode value for each identified character script feature; and assigning each identified character script feature a corresponding character script type from a set of possible character script types based on the corresponding unicode value for the identified character script feature; and predicting a probability distribution over possible languages for the token using a language identifier model configured to receive the extracted features from the token as feature inputs; and assigning a language to each token of the codemixed text by executing a greedy search on the probability distribution over the possible languages predicted for each respective token.

22. The system of claim 21, wherein the assigned character script type is associated with only one language.

23. A system for identifying codemixed text, the system comprising:

data processing hardware; and memory hardware in communication with the data processing hardware, the memory hardware storing instructions that when executed by the data processing hardware cause the data processing hardware to perform operations comprising:

receiving codemixed text;

segmenting the codemixed text into a plurality of tokens, each token comprising at least one character and delineated from any adjacent tokens by a space;

for each token of the codemixed text:

extracting features from the token by:

querying a lexicon library stored in memory hardware in communication with the data processing hardware, the lexicon library comprising a pool of word entries and corresponding language probability distributions for each word entry in the pool of word entries;

determining whether the token matches one of the word entries of the lexicon library; and when the token matches one of the word entries of the lexicon library, retrieving the corresponding language probability distribution for the word entry that matches the token; and predicting a probability distribution over possible languages for the token using a language identifier model configured to receive the extracted features from the token as feature inputs; and assigning a language to each token of the codemixed text by executing a greedy search on the probability distribution over the possible languages predicted for each respective token.

24. A system for identifying codemixed text, the system comprising:

data processing hardware; and
memory hardware in communication with the data processing hardware, the memory hardware storing instructions that when executed by the data processing hardware cause the data processing hardware to perform operations comprising:
receiving codemixed text;
segmenting the codemixed text into a plurality of tokens, each token comprising at least one character and delineated from any adjacent tokens by a space;
for each token of the codemixed text:
extracting features from the token; and
predicting a probability distribution over possible languages for the token using a language identifier model configured to receive the extracted features from the token as feature inputs; and
assigning a language to each token of the codemixed text by executing a greedy search on the probability distribution over the possible languages predicted for each respective token,
wherein the language identifier model includes a feed-forward neural network comprising:
an embedding layer configured to:
receive the feature inputs, each feature input comprising a sparse matrix;
map the sparse matrix of each respective feature input to dense embedding vectors, resulting in a learned embedding matrix; and
concatenate each learned embedding matrix corresponding to each received feature input;
a hidden layer interconnected with the embedding layer in a feed-forward manner, the hidden layer configured to:
receive the embedding layer; and
apply a rectified linear unit (ReLU) of the embedding layer; and
an output layer interconnected with the hidden layer in the feed-forward manner, the output layer configured to output a probability for each possible language for each respective token.

25. The system of claim 24, wherein the output layer comprises a softmax layer.

26. A system for identifying codemixed text, the system comprising:
data processing hardware; and
memory hardware in communication with the data processing hardware, the memory hardware storing instructions that when executed by the data processing hardware cause the data processing hardware to perform operations comprising:
receiving codemixed text;
segmenting the codemixed text into a plurality of tokens, each token comprising at least one character and delineated from any adjacent tokens by a space;
for each token of the codemixed text:
extracting features from the token; and
predicting a probability distribution over possible languages for the token using a language identifier model configured to receive the extracted features from the token as feature inputs, wherein the language identifier model executes a lexicon feature dropout strategy during training that drops a sub-set of extracted lexicon features as feature inputs; and
assigning a language to each token of the codemixed text by executing a greedy search on the probability distribution over the possible languages predicted for each respective token.

* * * * *